United States Patent Office 3,498,396
Patented Mar. 3, 1970

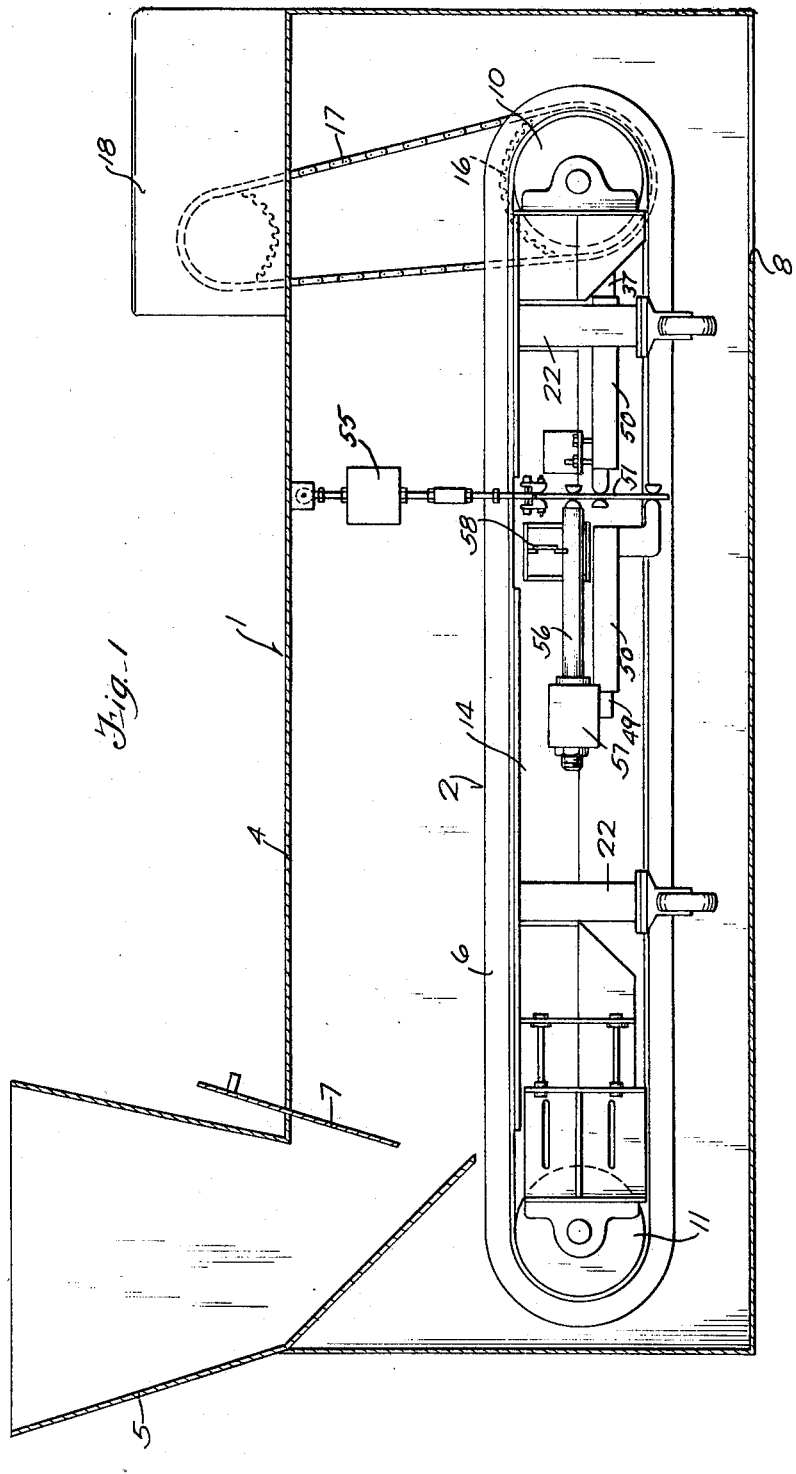

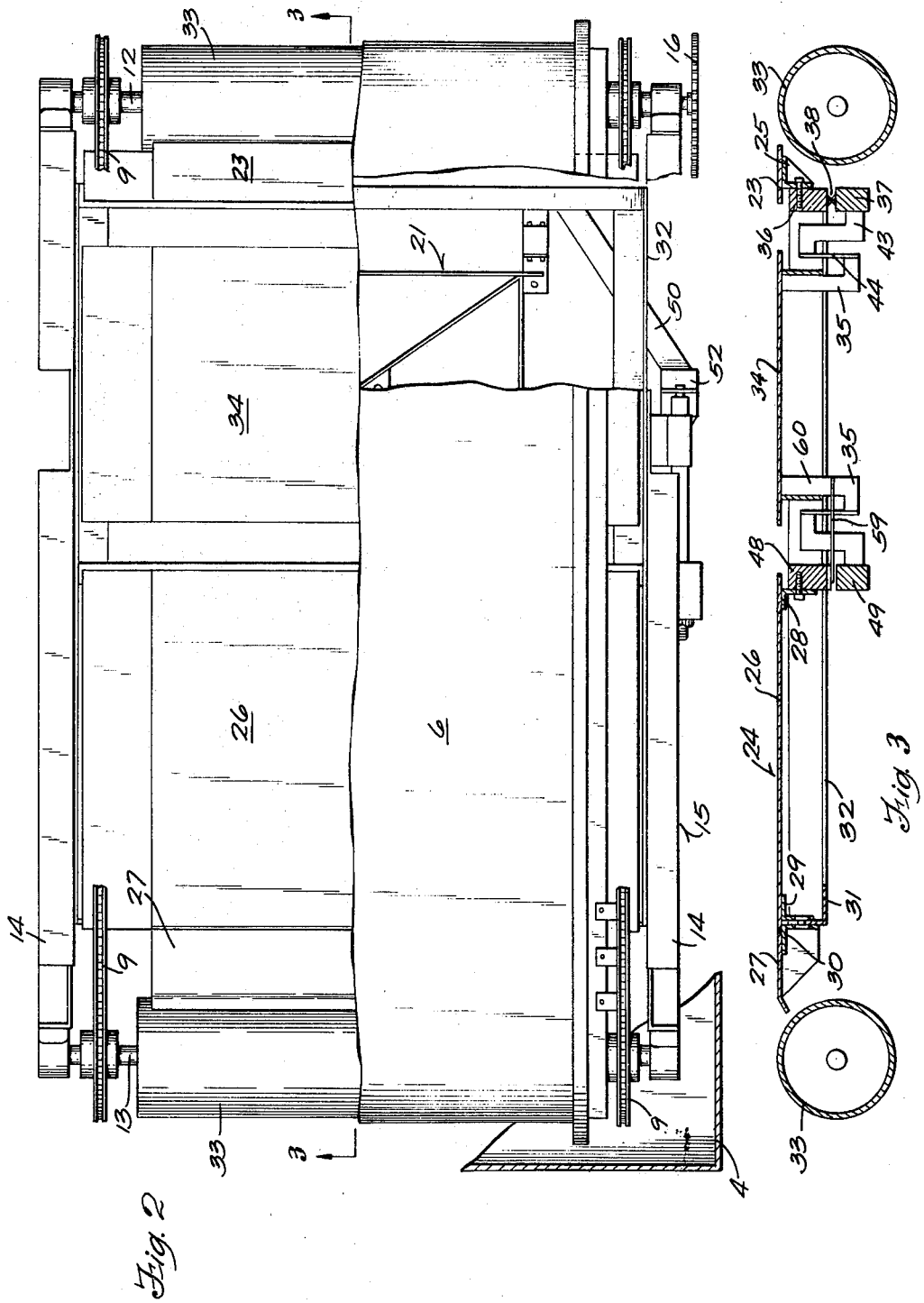

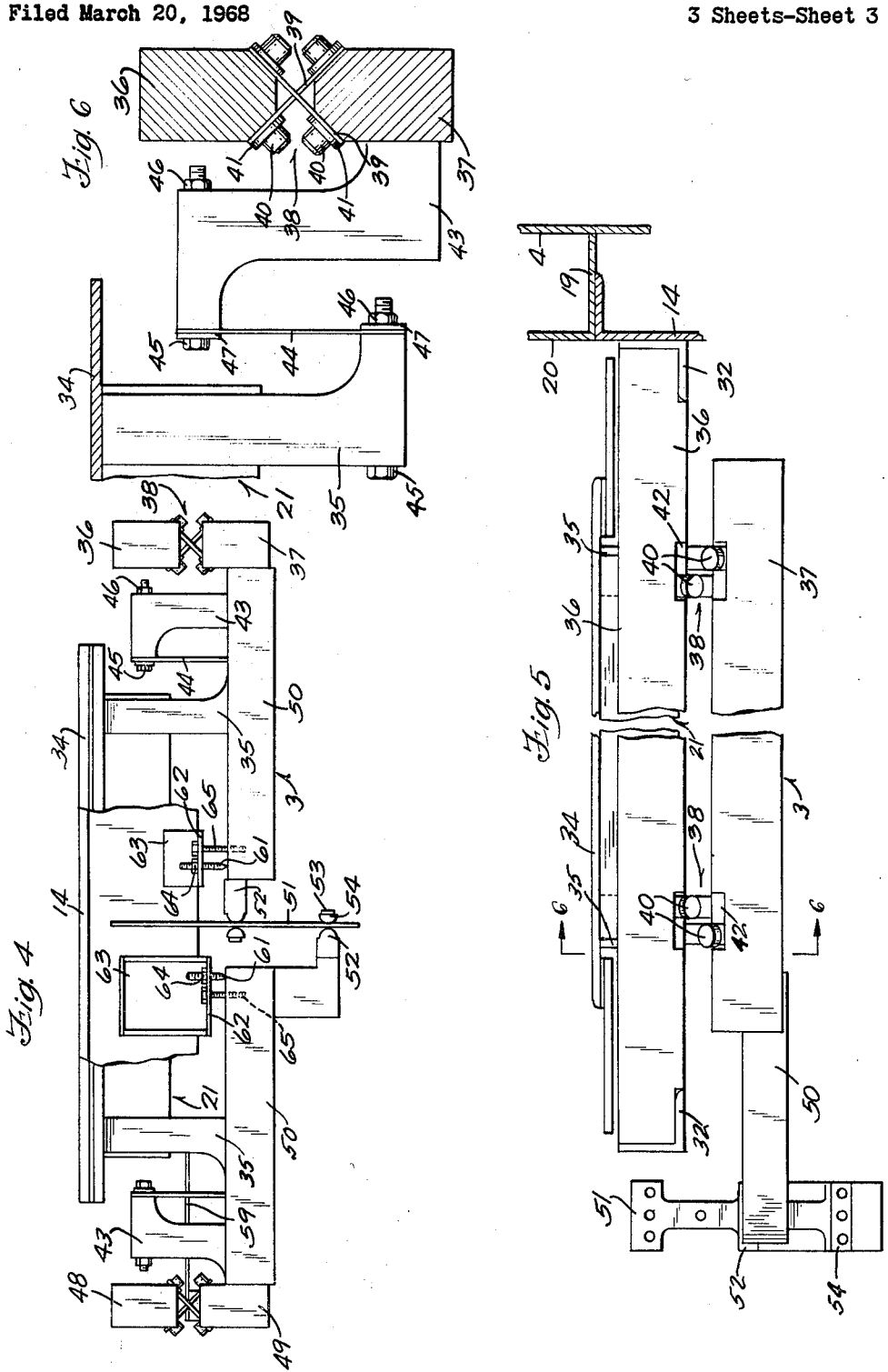

3,498,396
WEIGH FEEDER
William F. Johnston, Delafield, Thomas J. Stencel, Waukesha, and Fred Fixari, Greendale, Wis., assignors to Rex Chainbelt Inc., Milwaukee, Wis., a corporation of Wisconsin
Filed Mar. 20, 1968, Ser. No. 714,733
Int. Cl. G01g 11/14
U.S. Cl. 177—16
6 Claims

ABSTRACT OF THE DISCLOSURE

A weigh feeder has a belt conveyor and a compact weighing system removable intact from its operating position within the conveyor housing. The weighing system incorporates shortened lever arms and X-flexures at the primary pivots to reduce sag in the system under load to a minimum.

BACKGROUND OF THE INVENTION

Field of the invention

The present invention relates to weighing feeders of the type wherein a belt conveyor feeds material to be weighed over a weighing platform or structure and the deflection of the platform under load is collected and transmitted by a weighing system through lever arm, flexure and pivot means to a weight sensing device. The weight of the material being conveyed is continuously indicated by means relating the deflection of the weight sensing device to the length of material on the weighing platform or structure.

Description of the prior art

Weigh feeders of the type having a belt conveyor operable over a weighing platform with an associated load transmitting and weight sensing device are known in the art. The related prior art is exemplified by U.S. Patent No. 3,324,960, issued June 13, 1967 to R. R. Bauer et al. and entitled Weighing Mechanism for Conveyor. That patent discloses a weighing mechanism comprising a weighing platform suspended from a pair of coplanar interfitting lever frames which are suspended from the conveyor frame. The lever frames lie below the weighing platform and are connected by a number of flexure plates to a weigh beam disposed transversely of and below the weighing platform. One end of the weigh beam is connected to a load sensing device. The weighing platform and lever frames are suspended by various combinations of horizontally and vertically disposed biflexural plates in a manner such that the weighing mechanism is substantially rigid and allows only a very small deflection of the weighing platform under full load. The primary pivot for each lever frame comprises horizontal and vertical flexure plates which are disposed to form a pair of laterally aligned cross-flexures adapted to allow the respective lever arm to pivot thereabout and to accept a limited amount of horizontal displacement in the longitudinal direction due to the arc in which the lever pivots.

The rigid structure of the mechanism is balanced such that a load applied to the platform at any point on the surface thereof will cause a uniform deflection of all four corners of the platform and, thus, the same force will be applied to the load sensing device regardless of the position of the load on the weighing platform.

A major problem in weigh feeders of the prior art has been the adverse effect of sag in the structure of the weighing mechanism under load. Of primary importance in this type of weigh feeder is the maintenance as a constant the length of belt and material carried thereon actually supported by the weighing platform. Excessive deflection of the platform between zero and full load due to sag in the structure causes variations in the effective weigh length of the platform which necessitate recalibration of the weight indicating means with variations in the depth of the material on the belt. Recalibration must be made to avoid inaccuracies which would otherwise accumulate with increasing load.

The sag in prior art devices of the type described above may be attributed primarily to three separate structural characteristics. First, because the lever frames are necessarily of substantial length, bending unavoidably occurs in the longitudinal members thereof. Second, the horizontal flexure plates forming a part of the pivotal cross-flexures deflect vertically under load. And third, the weigh beam, which is of substantial length, is subject to considerable vertical deflection through the load transmitted thereto by the lever frames. The deflections of these members cumulatively result in substantially all the sag or vertical displacement of the weighing platform.

SUMMARY OF THE INVENTION

The present invention is directed to providing an improved weigh feeder with a weighing mechanism rigid enough to substantially eliminate all adverse sag and yet precise enough to retain the sensitivity of the prior art devices described. A weigh feeder is disclosed having a capacity and sensitivity comparable to devices known in the prior art, but having a cumulative sag or weighing platform displacement of approximately only one-tenth that of prior art devices.

In the present invention, a pair of laterally disposed force collecting members are used to perform the function of the lever frames of prior art structures. The members are short rigid beams which are subject to substantially no bending under load and which, therefore, eliminate a principal source of sag. Additionally, the main pivots of the weighing mechanism, by which each force collecting member is connected to a cross member of the conveyor frame, are a pair of laterally aligned X-flexures. Because an X-flexure does not have a horizontal flexure plate forming a portion thereof, as contrasted to a cross-flexure of prior art weigh feeders, it is not subject to vertical displacement under load.

A pair of short rigid weigh beams form a direct connection between the force collecting members and the weight sensing device. The weigh beams are, because of their rigidity, subject to significantly less bending than the single transverse weigh beam of the prior art device described previously. Thus, the third principal source of sag in the weighing mechanism is reduced considerably.

The cumulative effect of using the new and improved force collecting members, X-flexures and weigh beams in the weighing mechanism of the present invention is the provision of a more rigid structure that eliminates the problem of sag characteristic of prior art devices. In addition, the structure of the present invention is much less complex and the overall length of the weighing mechanism is reduced to approximately one-half that of prior art devices of like capacity.

The weighing mechanism is counter-balanced by a single counterweight adjustably mounted on a relatively short lever arm. The lever arm is pivotally suspended on a vertical biflexural plate which allows unrestricted horizontal movement of the counterweight thereby eliminating any restraint on the function of the collecting flexure through which the load is transmitted from the weigh beams to the weight sensing device.

The collecting flexure comprises a vertically disposed biflexural member attached at one end to the weight sensing device and to which one end of each weigh beam and the counterweight lever arm are flexibly attached. The collecting flexure is positioned to allow unrestricted movement of the attached ends of the weigh beams and the counter-weight lever arm about their respective pivot points in the arcs defined thereby.

BRIEF DESCRIPTION OF THE DRAWING

FIGURE 1 is a side elevational view of the weigh feeder with portions of the housing broken away;

FIG. 2 is a plan view of the weigh feeder with substantially all of the housing removed and portions of the conveyor and weighing system broken away;

FIG. 3 is a sectional view taken on line 3—3 of FIG. 2;

FIG. 4 is a side elevational view of the weighing system of the weigh feeder;

FIG. 5 is a front elevational view of the weighing system with portions of one side frame member and one side of the housing shown in section; and FIG. 6 is an enlarged side elevational view partly in section of the forward portion of the weighing system.

DESCRIPTION OF THE PREFERRED EMBODIMENT

A weigh feeder 1 includes a belt conveyor 2 and a weighing system 3 enclosed in a housing 4. The housing 4 includes a loading hopper 5 in the top of the housing above the rearward loading end of the conveyor belt 6. The flow of material onto the belt is controlled by the sliding gate 7 at the bottom of the loading hopper 5. The material is carried by the belt 6 to the forward end of the conveyor where it is discharged through an opening 8 in the bottom of the housing.

The conveyor belt 6 is attached to two endless strands of carrying chain 9 which operate about a pair of spaced drive sprockets 10 at the forward end of the conveyor 2 and a pair of tail sprockets 11 at the rearward end. The sprockets 10 and 11 are respectively fixed to the headshaft 12 and the tailshaft 13. Shafts 12 and 13 are journally mounted to the side members 14 of the conveyor frame 15. One end of the headshaft 12 carries a driven sprocket 16 operatively connected by drive chain 17 to motor 18 mounted on top of the conveyor housing 4.

The side members 14 of the conveyor frame 15 are bolted respectively to a pair of reinforcing shelves 19 forming horizontal inside extensions of the sides of the housing 4. Interior portions 20 join the inside edges of the reinforcing shelves 19 and the top of the housing 4. The weighing system 3, as will be described in greater detail below, is disposed within the upper and lower runs of the conveyor 2. Thus, by unbolting the side members 14 from the reinforcing shelves 19, the weigh feeder may be lowered onto the castered legs 22 for removal from the housing 4. Removable access panels allow the weigh feeder to be removed from either side, the front or the rear of the housing.

The forward and rear portions of the upper run of the belt 6 are supported respectively by the forward and rearward slider decks 23 and 24. The forward slider deck 23 is fixed to and supported by the forward lateral frame member 25. The rearward slider deck 24 comprises a forward portion 26 and a rearward portion 27. The forward portion 26 is fixed to and supported at its forward edge by the intermediate lateral frame member 28 and at its rear edge by the first rear lateral frame member 29. The rearward portion 27 of the rearward slider deck 24 is attached to and supported by the second rear lateral frame member 30. Rear lateral frame members 29 and 30 are bolted to a common lateral member 31 which in turn is fixed by its ends to the longitudinal deck frame members 32. Deck frame members 32 extend from lateral member 31 to the forward slider deck 23 and are attached respectively to the two side members 14. Deck frame members 32 also provide the support for lateral frame members 25 and 28 and the weighing system 3 as hereinafter described. The belt 6 is also supported and guided as it travels around the headshaft 12 and the tailshaft 13 by a pair of drum pulleys 33 attached respectively thereto.

The weighing system 3, as shown separately in FIGS. 4 and 5, is adapted to lie completely within the upper and lower runs of the conveyor belt 6 as is best shown in FIG. 1. A horizontal weighing platform 34 is disposed in the space between the opposing edges of the slider decks 23 and 24 and in the same horizontal plane therewith. The forward and rearward edges of the platform 34 are parallel to and equally spaced from said opposing edges. A rigid L-shaped bracket 35 is fixed to each corner of the platform 34 and depends downwardly from the underside thereof. A weighing platform supporting structure 21 is carried by the brackets 35.

A forward cross member 36 extends laterally beneath the forward slider deck 23 near the rear edge thereof and is attached by its ends respectively to the forward ends of the deck frame members 32. Forward lateral frame member 25, which supports the forward slider deck 23, is attached to one side of cross member 36. Lying beneath and parallel to forward cross member 36 is a forward force collecting member 37. It is flexibly attached to the cross member 36 by a pair of laterally spaced and aligned X-flexures 38.

As best shown in FIG. 6, each X-flexure 38 is formed by a pair of biflexural plates 39 diagonally disposed at right angles to each other, and each attached at its respective ends by means of bolts 40 and washers 41 to diagonally milled flats 42 on opposite sides of the cross member 36 and the force collecting member 37. The X-flexures 38 are the primary pivots about which the essential rotational movement of certain members of the weighing system occurs, as will be described in greater detail.

An intermediate bracket 43 is rigidly attached at one end to the force collecting member 37 directly beneath each X-flexure 38. The intermediate bracket 43 extends upwardly and toward the underside of the weighing platform 34 so that its other end lies vertically above the lower end of one of the rigid L-shaped brackets 35 which are attached to each corner of the platform 34. A biflexural suspension plate 44 connects the vertically aligned ends of the rigid bracket 35 and the intermediate bracket 43 and is fastened thereto at its ends by bolts 45, nuts 46, and washers 47.

A rearward cross member 48 extends laterally beneath the forward edge of the rearward slider deck 24 and is attached by its ends to the deck frame members 32. Intermediate lateral frame member 28, which supports the forward edge of the rearward slider deck 24, is attached to one side of the rearward cross member 48. A rearward force collecting member 49 is disposed beneath and flexibly attached to cross member 48 by a pair of laterally aligned and spaced X-flexures 38 in the same manner as the forward force collecting member 37 is connected to the forward cross member 36, as described above. Likewise, the rearward force collecting member 49 is connected to the rigid brackets 35 depending from the rearward corners of the weighing platform 34 by means of intermediate brackets 43 and biflexural suspension plates 44 as described.

A pair of weigh beams 50 are respectively rigidly attached by one of their ends to the forward and rearward force collecting members 37 and 49 at the corresponding ends thereof and extend outwardly and respectively rearwardly and forwardly therefrom. The other ends of the weigh beams 50 are connected respectively to opposite sides of the collecting flexure 51. The collecting flexure 51 is a biflexural plate vertically disposed on a plane through the lateral centerline of the weighing platform 34 and offset laterally therefrom so as to lie between the outward ends of the weigh beams 50. Said outward ends of the weigh beams 50 have semicylindrical end portions 52 adapted to be flexibly connected to the collecting flexure 51 by shoulder screws 53 passing through elongated semicylindrical washers 54 so as to clamp the collecting flexure 51 therebetween.

A weight sensing device 55, such as an electronic load cell, is connected at its lower end to the upper end of the collecting flexure 51 and at its upper end to the housing 4. A rigid counterweight arm 56 is attached at one end to the collecting flexure 51 intermediate the ends of the weigh beams 50 and the weight sensing device 55. An adjustable counterweight 57 is threaded onto the other end of the arm 56. The arm and counterweight are supported by a vertically disposed biflexural pivot 58 which is fixed at its lower end to the arm 56 intermediate its ends and fixed at its upper end to one of the side members 14. The counterweight arm 56 is flexibly attached to the collecting flexure 51 in a manner similar to that by which the weigh beams 50 are attached, as by clamping the collecting flexure between a semicylindrical end portion 52 and a semicylindrical washer 54 by means of a shoulder screw 53.

In operation, the weighing platform 34 is displaced vertically downward as a layer of material carried by the belt 6 passes thereover. Because of the rigid balanced construction of the weighing system 3, the displacement is very slight and, regardless of the unevenness of the layer of material or the position of the centroid of the material supported by the platform, the displacement of all four corners of the platform will be equal.

Referring particularly to FIG. 6, rigid bracket 35 will move vertically with the vertical displacement of the weighing platform. Because the forward cross member 36 is rigidly fixed by its ends to the deck frame members 32, the intermediate bracket 43 and the forward force collecting member 37 will be displaced as a unit horizontally as well as vertically. The biflexural suspension plate 44 offers substantially no resistance to this displacement so that the unitary movement of the intermediate bracket 43 and the force collecting member 37 takes the form of a rotation thereof about the apparent axis of the aligned X-flexures 38.

The rotation of the force collecting member 37 produces a corresponding rotational movement of the rigidly attached weigh beam 50. A consequent displacement vertically downward of the collecting flexure 51 to which the other end of the weigh beam 50 is attached is transmitted directly to the weight sensing device 55. It will be readily apparent that the foregoing description of the operation of the forward portion of the weighing system applies as well to the simultaneous operation of the rearward portion except that, when viewed from the same side, the rotational movements of the corresponding elements of the two portions are in opposite directions.

The effective weigh length of a weigh feeder, which is the portion of the belt 6 and the material carried thereon actually supported by the weighing platform 34, must be maintained as closely constant as possible to insure maximum accuracy. The effective weigh length of the weigh feeder of the present invention is the distance between the midpoints of the spaces between the forward and rearward edges of the weighing platform 34 and the opposing edges of the slider decks 23 and 24 respectively. These midpoints mark the transition points between support of the belt and material by the slider decks and support by the weighing platform. However, as the platform 34 is deflected downwardly under load below the horizontal plane of the slider decks, the belt 6 which is under tension "bridges" the forward and rearward edges of the platform and does not contact the full length of the platform. As a result the load support transition points move toward the center of the weighing platform 34 thereby causing a decrease in the effective weigh length.

It has been found that by increasing the rigidity of the components of the weighing system and thereby reducing the total deflection of the weighing platform 34 under full load the variable bridging effect may be reduced considerably. Additionally, increasing the spacing between the edges of the platform 34 and the opposing edges of the slider decks 23 and 24 reduces the vertical angle formed by the belt 6 between the edges of the slider decks and the deflected weighing platform, thereby reducing the magnitude of the variable bridging effect for a given deflection.

The substantial increase in the rigidity of the weighing system of the present invention over the prior art is a result of the compact arrangement of short rigid force collecting members 37 and 49 and weigh beams 50 supported for rotational deflection by the X-flexures 38. The force collecting numbers and the weigh beams, as well as the lateral supporting cross members 36 and 48, are free from any substantial bending under load, a principal source of sag in prior art weigh feeders. Also, the X-flexures are characteristically not subject to vertical deflection under load. As a result, the sag in the weighing system, cumulatively measured as the total vertical displacement of the weighing platform under load, is approximately only nine and one-half thousandths of an inch under a load of 500 pounds or roughly only one-tenth that of the prior art device described previously.

The force collecting members 37 and 49 each rotate respectively about an axis through the pair of aligned X-flexures 38 by which each force collecting member is supported. Each axis is defined by a line through the apparent intersections of the pairs of biflextural plates 39 forming the X-flexures. With the rotation of the force collecting members, there is a displacement of the biflexural plates 39 forming each X-flexure 38 both relative to each other and to their static no-load positions. However, the apparent intersection of each pair of plates, and hence the rotational axis formed thereby, remains fixed because the relative displacements thereof are equal and opposite and, therefore, compensating, a characteristic of X-flexures of this type. Consequently, the lever arm between the lower end of the rigid bracket 35 and the center of the X-flexure 38 remains constant regardless of the magnitude of the deflection of the weighing system between zero and full load. As a result, the deflection of the weighing platform 34 bears a constant linear relation to the rotational displacement of the force collecting members 37 and 49 which in turn is, as described above, transmitted directly to the weight sensing device 55.

As the weigh beams 50 rotate under load due to their rigid connections to the force collecting members 37 and 49 respectively, the ends by which they are flexibly attached to the collecting flexure 51 are displaced horizontally in opposite directions as well as vertically downward. The collecting flexure 51 is a biflexural plate and is disposed to accept the horizontal displacement and prevent it from being adversely transferred to the weight sensing device 55. In order that the collecting flexure may flex freely under the opposite horizontal loads, the semicylindrical end portion 52 of one of the weigh beams 50 is offset vertically below the other, as is best shown in FIG. 4.

In operation, the frictional force developed by the belt 6 as it travels over the weighing platform 34 tends to pull the platform horizontally in the direction of belt travel. To prevent this horizontal displacement of the weighing platform, a pair of biflexural horizontal stays 59 connect the platform to the rearward cross member 48. One end of each horizontal stay 59 is attached to the underside of the cross member 48 and the other end is attached to the lower end of a stay bracket 60 depending downwardly from the underside of the weighing platform 34. The stays 59 are disposed to flex freely with the vertical movement of the weighing platform. As best shown in FIG. 4, the stays 59 lie in the horizontal plane through the centers of the X-flexures 38 and the midpoints of the biflexural suspension plates 44. In this manner any forces of belt friction imparted to the stays 59 will act directly through the primary pivotal axes formed by the X-flexures and will not produce an adverse moment thereabout.

It is desirable in a weigh feeder of the present invention to provide means for positioning the weighing platform in coplanar relation to the slider decks 23 and 24 to facilitate rapid and accurate installation and replacement of the weight sensing device 55. A locating bolt 61 is threaded through a horizontal flange 62 of the positioning bracket 63 attached to side member 14 above the outer end of each of the weigh beams 50. The locating bolt 61 is turned down into contact with the top side of the weigh beam when the top of the weighing platform 34 is level with the tops of the slider decks 23 and 24. A nut 64 is threaded onto the top of the locating bolt and turned down into contact with the top of the horizontal flange 62. The nut 64 is tack welded to the locating bolt to permanently establish the correct location of the weigh beam and yet allow the bolt to be backed off or withdrawn after the weight sensing device is installed. A locking bolt 65 is threaded into a tapped hole in each weigh beam and is drawn tight against the top of flange 62 to hold the weigh beam against the lower end of its respective locating bolt 61. The locking bolts 65 are removed after installation of the weight sensing device 55.

The force collecting members 37 and 49 and the weigh beams 50 attached thereto are of solid steel construction to provide the necessary rigidity and, consequently, add considerable weight to the weighing system. The weight of these members along with the weight of the counterweight 57 provide an effective damping against abrupt movements of the mechanism occasioned by changes in the depth and weight of material on the belt.

While the invention has been particularly shown and described with reference to a particular embodiment thereof, it will be understood by those skilled in the art that various changes in form and details may be made therein without departing from the spirit and scope of the invention.

What is claimed is:

1. The combination of a belt conveyor having a rearward loading end and a forward discharge end and a weighing system continuously indicating the weight of a given section of the material being conveyed comprising, a conveyor frame having spaced, coplanar fixed horizontal slider decks extending frowardly and rearwardly respectively from the loading and discharge ends of the conveyor, an endless belt operating thereover, a rectangular horizontal weighing platform intermediate the opposing edges of said decks and having forward and rearward edges in equally spaced parallel relation thereto, a rigid bracket depending downwardly from each corner of said platform, forward and rearward cross members fixed by their ends to said frame and extending beneath and attached by their intermediate portions to said slider decks respectively near the opposing edges thereof, forward and rearward force collecting members disposed respectively beneath and parallel to said cross members, a pair of laterally spaced and aligned X-flexures pivotally connecting each force collecting member to the corresponding cross member, an intermediate bracket rigidly attached at one end to each force collecting member adjacent each of said X-flexures and extending upwardly and toward said platform so that the other end of said intermediate bracket lies vertically above the lower end of the corresponding rigid bracket, a biflexural suspension plate connecting the vertically aligned ends of each intermediate bracket and its corresponding rigid bracket, a collecting flexure vertically disposed on a plane through the lateral centerline of said platform and spaced outwardly from one lateral edge thereof, a pair of weigh beams each respectively rigidly attached at one end to one of said force collecting members at the end thereof nearest said collecting flexure and flexibly attached at its other end to said collecting flexure, and a weight sensing device connecting the upper end of said collecting flexure and one side of said frame, so that a downward movement of said weighing platform due to a load on the belt operating thereover is transmitted to said force collecting members and translated into a rotational movement thereof about the axes of said aligned X-flexures, whereby the rotation of the force collecting members produces a corresponding rotation of said attached weigh beams and a vertical displacement of said collecting flexure relative said weight sensing device.

2. The combination as described in claim 1 including horizontally disposed biflexural stay members each attached by its respective ends to said rearward cross member and the rearward edge of said weighing platform, said stay members providing resistance to horizontal displacement of said weighing platform due to the frictional force of the conveyor belt operating thereover and providing no substantial adverse resistance to vertical displacement of said platform.

3. The combination as described in claim 1 including a counterweight assembly comprising a rigid arm flexibly attached at one end to said collecting flexure intermediate said weight sensing device and the flexibly attached ends of said weigh beams, a counterweight adjustably attached to the other end of said arm, and a vertically disposed biflexural pivot fixed at its lower end to said arm intermediate the ends thereof and fixed at its upper end to said frame whereby said arm may pivot with the described vertical displacement of said collecting flexure and simultaneously be substantially unrestrained from horizontal movement induced by the vertical displacement.

4. The combination as described in claim 1 wherein said weigh beams are flexibly attached to said collecting flexure in vertically spaced relation whereby the horizontal movement of said weigh beams respectively in opposite directions due to the described rotational movement thereof under load is substantially unrestrained.

5. The combination as described in claim 1 wherein adjustable locating and locking means are provided to fix the location of said weighing platform in coplanar relation to said slider decks under static no-load condition whereby said weight sensing device may be removed and replaced without affecting the location of said weighing platform.

6. The combination as described in claim 1 including locating and locking means comprising a pair of positioning brackets attached to the conveyor frame and having outwardly extending horizontal flanges disposed above the adjacent ends of said weigh beams, a pair of fastener receiving means carried by each flange, a pair of fastening members receivable in said fastener receiving means of each flange and threadably engageable respectively by one of said fastener receiving means and the weigh beam directly below the other of said fastener receiving means whereby said weigh beams may be located and locked in their respective static no-load positions thereby securing said weighing platform in coplanar relation to said slider decks to facilitate removal and accurate replacement of said weight sensing device.

References Cited

UNITED STATES PATENTS 3,148,742   9/1964   Giulie.
3,324,960   6/1967   Bauer et al. _____ 177—16

FOREIGN PATENTS 1,310,375   12/1962   France.

RICHARD B. WILKINSON, Primary Examiner

G. H. MILLER, JR., Assistant Examiner

U.S. Cl. X.R,

198—39